United States Patent [19]

Beacon

[11] 3,960,411
[45] June 1, 1976

[54] EMPTY-LOAD BRAKE WITH LADING CONTROLLED RESERVOIR

[75] Inventor: Robert G. Beacon, Sparta, N.J.
[73] Assignee: Ellcon-National, Inc., Totowa, N.J.
[22] Filed: July 28, 1975
[21] Appl. No.: 599,827

Related U.S. Application Data

[63] Continuation-in-part of Ser. No. 541,266, Jan. 15, 1975, abandoned.

[52] U.S. Cl. ............................. 303/23 R; 188/195
[51] Int. Cl.² ......................................... B60T 8/20
[58] Field of Search......... 188/195; 303/22 A, 22 R, 303/23 A, 23 R

[56] References Cited
UNITED STATES PATENTS

| | | | |
|---|---|---|---|
| 2,075,321 | 3/1937 | Wine | 188/195 |
| 2,184,551 | 12/1939 | Hewitt | 303/22 R |
| 3,891,280 | 6/1975 | Severinsson et al. | 303/22 R |

*Primary Examiner*—Duane A. Reger
*Attorney, Agent, or Firm*—Brooks Haidt Haffner & Delahunty

[57] ABSTRACT

A compensating air reservoir for changing the braking force of the brakes of a car, such as a railway car intended to transport particulate material, is connected to the air line which supplies air to the brake cylinder and piston assembly of the car. The air reservoir has a movable wall forming a portion of the car wall and directly engageable by said material. The movable wall controls a valve on a wall of the reservoir so that when the car is empty, the valve is open permitting air to flow into the reservoir, thereby reducing the braking force, and so that when the car is loaded, the valve is closed, thereby permitting maximum braking force. The maximum pressure in the reservoir is limited by a limiting valve, and in modified embodiments, the valve which controls the admission of air to the reservoir does not open until the braking air pressure reaches a predetermined level. Two or more reservoirs are used to provide more than two braking force levels.

29 Claims, 9 Drawing Figures

FROM BRAKE
CYLINDER
AIR SUPPLY

EMPTY-LOAD BRAKE WITH LADING CONTROLLED RESERVOIR

This application is a continuation-in-part of my co-pending application Ser. No. 541,266, filed Jan. 15, 1975 and entitled "Empty-load Brake with Lading Controlled Reservoir", now abandoned.

This invention relates to brake mechanisms and particularly to empty and load brake mechanisms for railway cars.

It is well-known in the art that different braking forces are desirable for railway cars, the braking forces varying with the weight of the car and its load. Thus, the braking force should be high when the car is fully loaded and should be less with lighter loading of the car. Various systems have been devised to accomplish the variation in braking forces, and one such system is disclosed in my prior U.S. Pat. Nos. 3,608,680 and 3,704,046.

In the system described in said patents, a load compensating cylinder assembly, which is variable in internal volume, is connected to the brake cylinder pipe which supplies air to the brake cylinder when the car is braked. The volume of the load compensating cylinder assembly is adjusted by linkages which are operated in accordance with the movement of the car frame with respect to the car truck with load on the car. Thus, when the car is lightly loaded the volume is relatively large, and when the car is heavily loaded, the volume is relatively small. As explained in said patents, the braking force is high when the volume of the compensating cylinder assembly is small and vice versa.

Although the system described in said patents operates satisfactorily, a substantial number of moving parts and mechanical linkages are required. In addition, it is sometimes difficult to install the required apparatus on some railway cars because of the configuration or space limitations of such cars. It will also be noted that the braking force is controlled by indirect measurement of the load, i.e., by measurement of car body deflection with load which may cause the application of improper braking forces due to loss of car spring resiliency or when only a single sensor is used, due to leaning of the car because of uneven loading or the condition of the track.

It has been suggested in the prior art that the braking force can also be controlled in accordance with the load by providing a movable plate on the car which is directly engaged by the material which is to be transported and which forms the load for the car. For example, U.S. Pat. No. 1,091,596 discloses a hinged door on the floor of a car which operates a three position valve through a series of levers for controlling the diversion of air from the brake cylinder. See also U.S. Pat. No. 2,077,920 which discloses the use of deflection of the slope sheet of a hopper car for controlling, through a series of levers, a change-over device.

The apparatus disclosed in such U.S. Pat. Nos. 1,091,596 and 2,077,920 is advantageous from a practical standpoint because of the need to install various brackets and levers which increases the cost of installation and which, because of space limitations, is sometimes difficult to accomplish. In addition, such levers, etc., are exposed to the weather and dusty and corrosive conditions rendering them subject to malfunctioning in operation. Furthermore, the operation of the apparatus is not independent of the position of the car floor or slope sheet which may buckle or shift after use for a period of time which can either render the apparatus ineffective or provide braking for a load which is not the actual car load.

One object of the invention is to provide improved brake force controlling apparatus which does not require external levers and/or linkages exposed to the atmosphere.

Another object of the invention is to provide improved brake force controlling apparatus in which substantially all the moving parts are enclosed in a sealed container.

A further object of the invention is to provide improved brake force controlling apparatus which is substantially unaffected in operation by buckling or shifting of a car wall or floor.

In accordance with the preferred embodiment of the invention, a compensating reservoir assembly having a movable wall is mounted on a wall or floor of a car with such movable wall replacing a corresponding portion of the car wall or floor. Such assmebly is also connected by an air line to the input to the brake cylinder, and there is a valve internally of the reservoir which is closed, or permitted to open, dependent upon the position of said movable wall, and hence, the force applied thereto by the lading of the car which is in direct contact with said movable wall. Accordingly, when the valve is closed maximum braking force is applied and when the valve is open the braking force is reduced to a level dependent upon the volume of the reservoir. The opening and closing of the valve is settable so as to permit the valve to be set to close at the desired lading weight. Preferably, a pressure limiting valve is connected to the reservoir so as to limit the pressure therein upon emergency brake application.

In accordance with a further embodiment of the invention, a plurality of said compensating reservoir assemblies is mounted on a car either at different locations or at the same location, but with different valve settings, so as to provide three or more braking force levels.

Other objects and advantages of the invention will be apparent to those skilled in the art from the following detailed description of the presently preferred embodiments thereof, which description should be considered in conjunction with the accompanying drawings, in which.

Figure 6:
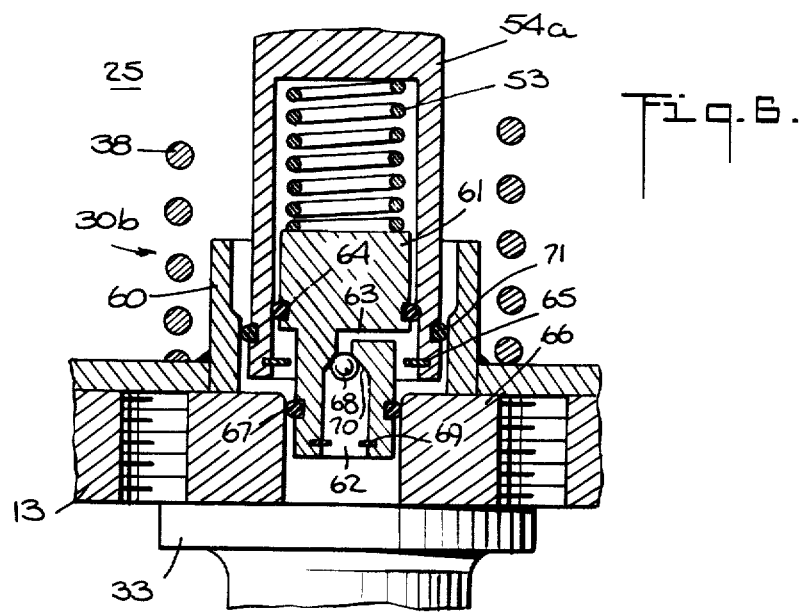
Figure 7:
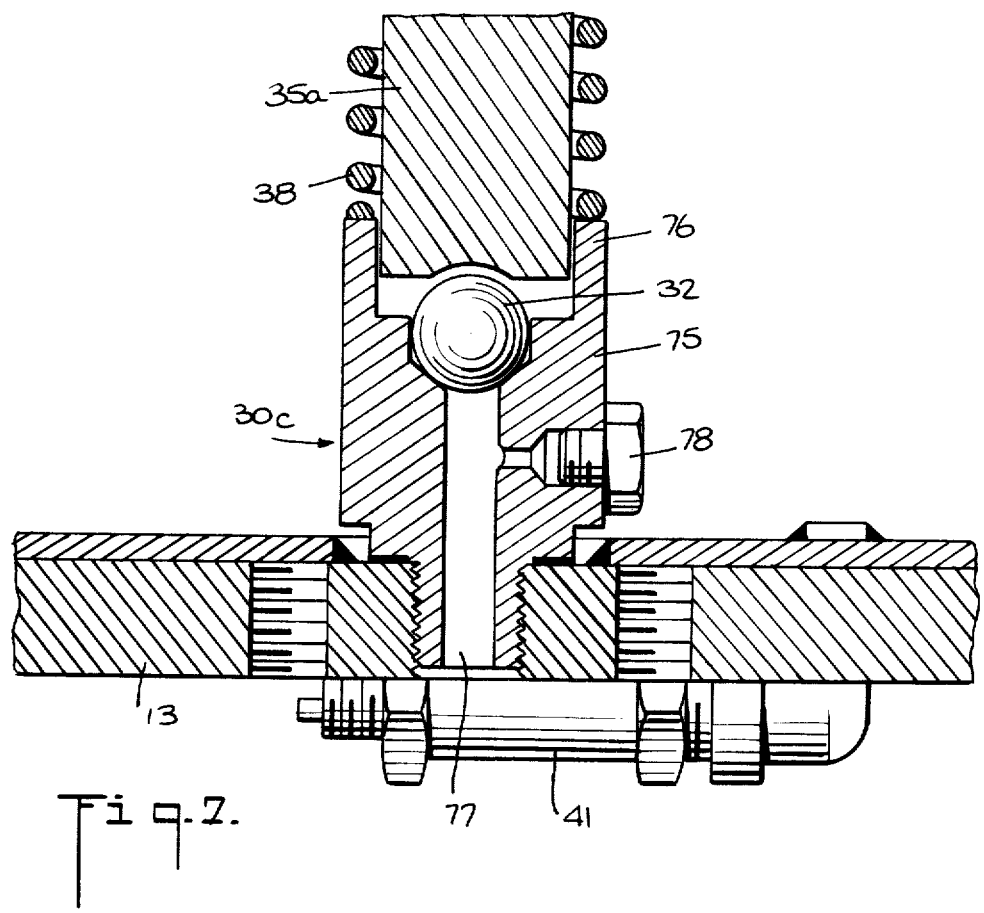
Figure 8:
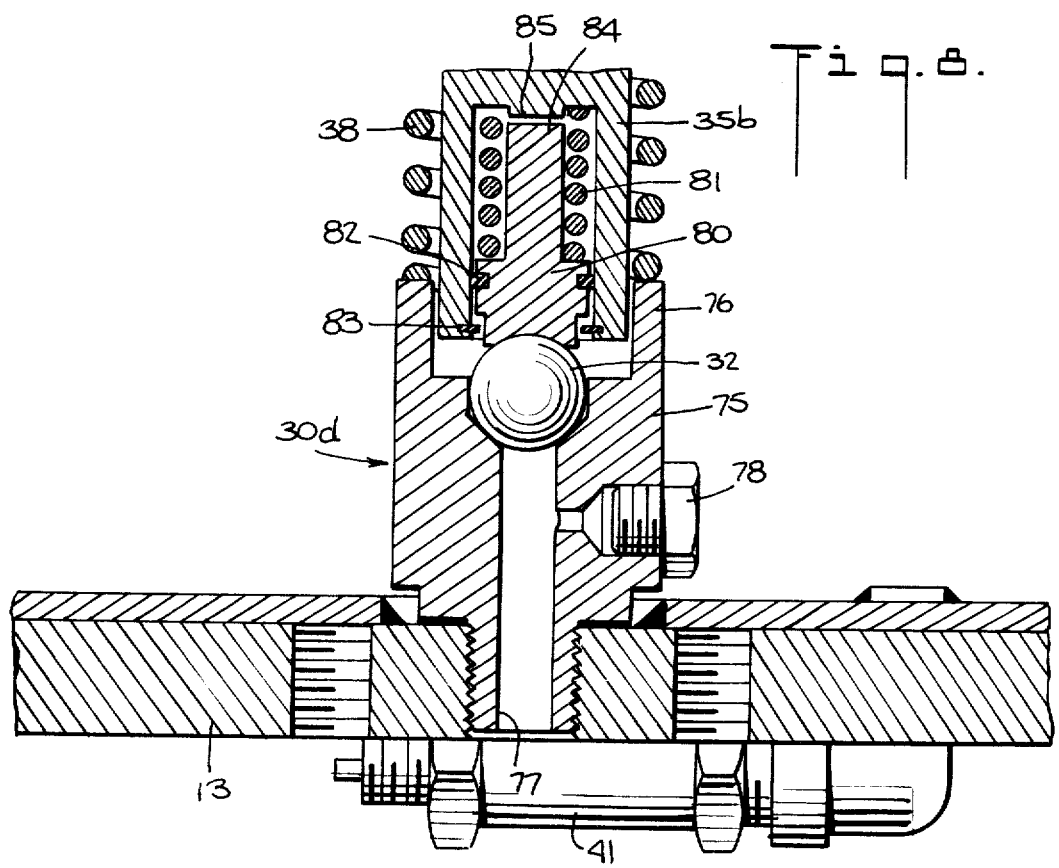
Figure 9:
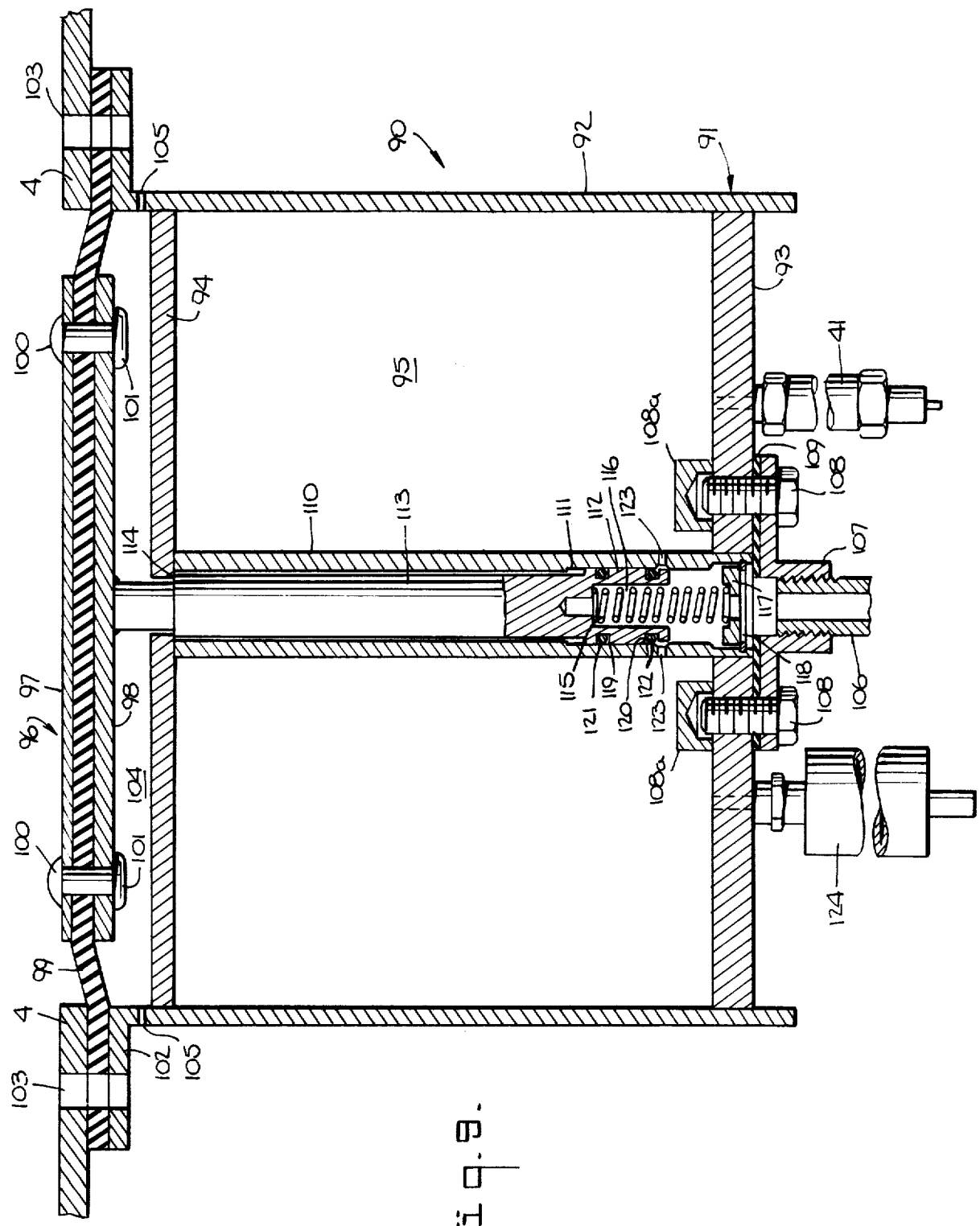

FIGS. 6, 7, and 8 are side elevation, cross-sectional, fragmentary views of modified valve portions for the compensating reservoir assembly of the invention, and FIG. 9 is a side elevation view, partly in cross-section, of another modified form of the compensating reservoir assembly of the invention.

Figure 1:
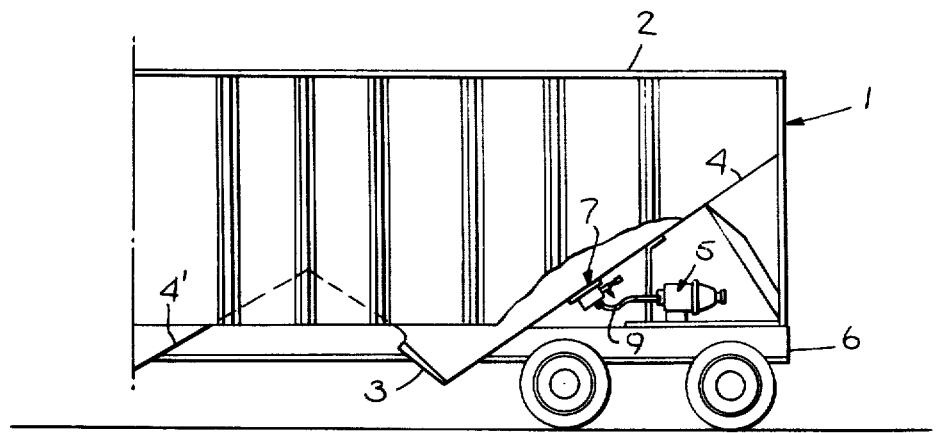
FIG. 1 is a fragmentary, schematic, side elevation view of a railway hopper car with an embodiment of the compensating reservoir assembly of the invention mounted on a slope sheet of such car.

The compensating reservoir assembly is useful primarily in connection with cars, such as railway cars, which transport particulate material, such as coal, grain, etc., rather than larger individual items, such as crates, cartons, etc., although it will be apparent that it may also be used in cars intended for transporting such items. Normally, a railway car which transports particulate material is either fully or nearly fully loaded or is empty. FIG. 1 illustrates a railway hopper car 1 which receives the lading, e.g., coal, crushed rock, etc. at its top 2 and discharges the lading through doorways 3 at its bottom. To assist in discharging the lading, such a hopper car has a plurality of slope sheets, such as the slope sheets 4 and 4', which support the lading.

A conventional fluid operable brake cylinder and piston assembly 5 is mounted from the frame 6 of the car 1 and is connected by conventinal means (not shown) to the brakes of the car 1. The cylinder and piston assembly 5 is also connected by means, such as a fluid line 8, to a valve at the output of a fluid reservoir of predetermined volume (not shown). The fluid normally is air and upon actuation of said valve, in a manner well-known in the art, air under pressure is supplied from the reservoir to the cylinder and piston assembly 5 to operate the brakes. When such latter valve is operated to the brakes release position, the air pressure in the cylinder and piston assembly 5, and hence, in the line 8, drops to a relatively small value, or zero.

The air line which supplies the air to the cylinder and piston assembly 5, or the input of the cylinder and piston assembly 5, is connected to a compensating reservoir assembly 7 of the invention through an air line 9, the compensating reservoir assembly 7 being mounted on the slope sheet 4. Usually, the slope sheet 4 is supported against vertical movement by one or more supports 10. Preferably, the assembly 7 is located as close as possible to the assembly 5 to keep the line 9 as short as possible and thereby prevent any significant reduction of the braking force because of the internal volume of the line 9.

Figure 3:
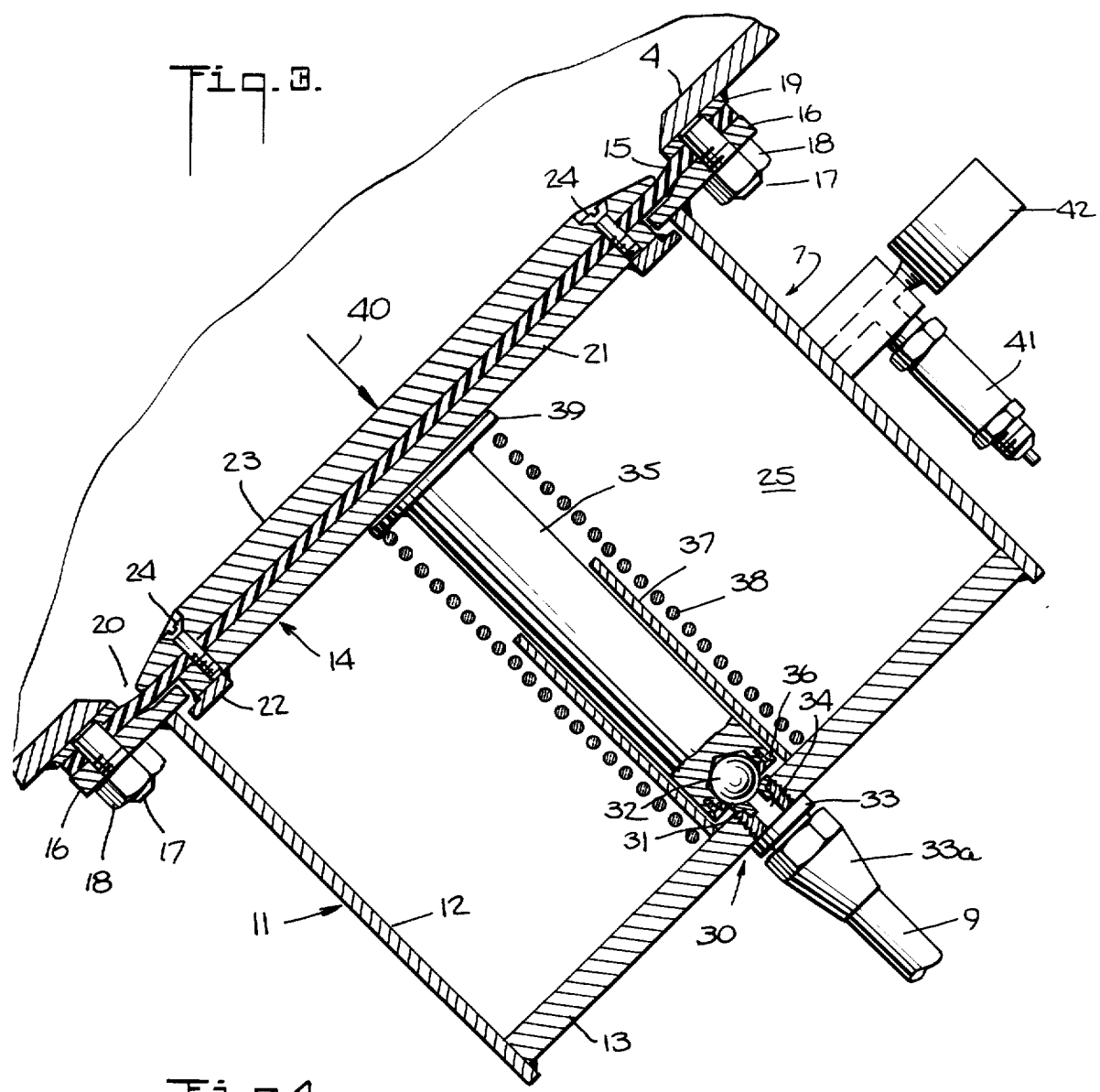
FIG. 3 is a further enlarged, side elevation, cross-sectional view of the compensating reservoir assembly shown in the preceding figures.

With reference to FIG. 3, the compensating reservoir assembly 7 of the invention comprises a cylinder 11, having a cylindrical wall 12, a fixed end wall 13 and a movable end wall 14. The movable end wall 14 is supported by a flexible elastomeric disc or diaphragm 15, which, along with the flange 16 secured to the cylindrical wall 12, is secured to the slope sheet 4 by a plurality of studs 17 and nuts 18. The studs 17 are secured to a ring 19 which is welded to the slope sheet 4 around an opening 20 which has been cut in the slope sheet 4.

Preferably, the movable end wall 14 comprises an inner circular metal plate 21 having a plurality, e.g., four, of outwardly extending tabs 22 secured thereto, such tabs 22 being engageable with the inner portion of the flange 16 to limit the outward movement, i.e., movement upwardly to the left as viewed in FIG. 3, of the movable end wall 14. The movable end wall 14 also comprises a circular metal wear plate 23 secured to the inner plate 21 by bolts 24. Thus, except for the valve openings hereinafter described, the walls 12, 13, and 14 of the compensating reservoir assembly form an air-tight chamber 25.

An air valve 30 is mounted on the wall 13 and comprises a seat 31, preferably made of a corrosion resistant material, such as an elastomer, brass, etc., and a flow control element in the form of a ball 32 engageable with the seal 31 and acting as the control means for the valve 30. Although in this embodiment and the embodiments described hereinafter the flow control element is a ball, it will be apparent to those skilled in the art that other elements, such as a disc, cone, etc., may be substituted and that different forms of the valve 30 may be employed. A connector 33 interiorly of the coupling nut 33a connects the valve 30 through the air line 9 to the air supply for the brake cylinder and piston assembly 5. The valve 30 has an air passageway 34 therethrough which, when the ball 32 is lifted from the seat 31, permits air to flow from the line 9 into the chamber 25 and when the ball 32 is held against the seat 31, prevents the flow of air from the line 9 into the chamber 25.

The ball 32 is received in a recess at the end of a shaft 35 and is held in such recess by a retaining ring 36. The shaft 35 is secured at its end nearer the movable wall 14 to a ring 39, and the shaft 35 acts as means for interconnecting the movable wall 14 with the control or ball 32 of the valve 30.

The shaft 35 is slidably received within a tube 37 mounted on and secured to the end wall 13. The tube 37 is surrounded by a compression spring 38 which bears at one end against the wall 13 and at the opposite end against the ring 39 secured to the shaft 35. Thus, the movable wall 14 is normally urged outwardly by the spring 38 so that the tabs 22 engage the flange 16 and so that the ball 32 may be disengaged from the seat 31 to permit air to flow from the line 9 into the chamber 25.

However, when sufficient force is applied to the wear plate 23 in the direction of the arrow 40, such as by the weight of the lading in the car 1, the movable wall 14 will be moved inwardly against the force of the spring 38, and the force of the air which may be applied to the ball 32, to hold the ball 32 against the seat 31 and thereby prevent passage of air from the line 9 into the chamber 25. It will be apparent that the magnitude of such force 40 required to close the valve 30 depends upon the opposing force of the spring 38 and the air pressure in the line 9 and, therefore, by suitably selecting the strength of the spring 38, the amount of force applied by the lading, and hence, the weight thereof, for the closing of the valve 30 may be set to any predetermined desired value. In FIG. 3, the parts are shown in the positions assumed thereby when the force on the wall 14 is sufficient to close the valve 30.

In the preferred embodiment of the invention for use with railway cars which are either empty of nearly fully loaded, the force applied by the spring 38 holds the valve 30 open when the weight on the plate 23 has a valve up to a weight corresponding to about 20% of the full load weight, but permits the valve 30 to close with a greater weight on the plate 23. It will be observed that when the lading is particulate material and the top of the material is level, the weight on the wall 14 will be related to the entire weight of the material in the car. Furthermore, the weight on the wall 14 with different material levels depends upon the portion of the wall of the car, e.g., the slope sheet 4 or another wall, at which the wall 14 is mounted. For example, if the wall 14 forms a part of the bottom wall or floor of the car, then, for operation at 20% of the full load weight, the opposing force of the spring 38 should be greater than the force thereof when the wall 14 forms a part of a side wall or slope sheet 4 which is spaced above the floor. If the wall 14 is near the top of a side wall of a car, the opposing force of the spring 38 may be only sufficient to permit the valve 30 to open with brake application until a relatively small weight on the wall 14 will hold the valve 30 closed with brake application. If a car is always either empty or full, the wall 14 may be on the bottom wall or floor of the car, or as close thereto as possible, and the spring 38 may permit the valve 30 to close with only a relatively small weight on the wall 14.

When the air pressure in the brake cylinder and piston assembly 5 is reduced to release the brakes, the air pressure in the line 9 will similarly reduce. If, at this time, the valve 30 is held open by the spring 38, the air pressure in the chamber 25 will drop to the air pressure in the assembly 5 which may be substantially zero when the brakes are fully released.

In the preferred embodiment of the invention, an adjustable pressure limiting valve 41, similar to a safety valve, is also connected to the chamber 25 so as to limit the air pressure therein, and hence, in the brake cylinder and piston assembly, to the desired air pressure with light loads and the application of emergency braking air pressure. When there is an emergency brake application, a second air reservoir is connected to the brake cylinder and piston assembly 5 so that the air pressure in the line 9 increases above normal, usually 15–20% above normal. However, the rules applicable to railway car operation require that the car wheels not skid on the rails with the application of emergency braking air pressure, and when such latter pressure is applied, the air pressure in the chamber 25, and hence, the assembly 5, may be above that desired for the braking of an empty car without skidding of the car wheels. For these reasons, the valve 41 is set so as to limit the pressure in the chamber to a pressure above normal service braking pressure which, from experience, will limit the pressure in the chamber 25 to that which will provide emergency braking of an empty car without locking of the car wheels under normal rail and wheel conditions.

For the purpose of determining whether the reservoir assembly 7 is set for its light load or full load condition, a pressure indicator 42 may also be connected to the chamber 25 to indicate the state of the valve 30. Thus, when the car is empty and the brakes are applied, those concerned can ascertain whether or not the reservoir assembly 7 is operating by observing the pressure indicator 42 which, if the reservoir assembly 7 is working properly, will indicate an air pressure equal to the pressure in the brake cylinder and piston assembly 5. Similarly, if the car is loaded and the assembly 7 is working properly, the pressure in the assembly 5 will be a maximum and the indicator 42 will indicate zero pressure.

Normally, the air pressure in the brake cylinder and piston assembly 5 for an empty car will be about 60% of the air pressure for a loaded car. The volume of the chamber 25 is selected so that with an empty car, and hence, with the valve 30 open, the air pressure in the assembly 5 will be reduced to the desired value, e.g., 60% of the full load value, when air is supplied thereto from the conventional air reservoir of predetermined volume. Thus, as the brakes are applied with an empty car, the braking forces will correspond to those produced by such desired air pressure value. However, when the lading weight on the plate 23 increases to a value such that the valve 30 closes, substantially all the air from said air supply reservoir will be supplied to the assembly 5 thereby producing the maximum braking force. Although the valve 41 and its functions may be omitted, the valve 41 is preferred for the reasons stated.

Figure 4:
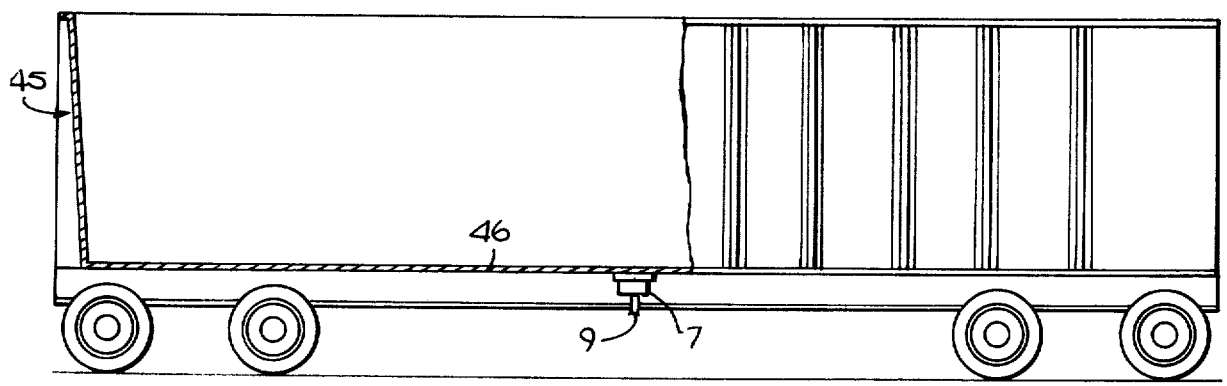
FIG. 4 is a side elevation view, partly in cross-section, showing the mounting of the compensating reservoir assembly of the invention on a railway gondola car.

FIG. 4 illustrates the application of the compensating reservoir assembly 7 to a gondola car 45, the assembly 7 being secured to the bottom wall or floor 46 of the car 45 so that the movable wall 14 forms a portion of the floor 46 of the car 45. The operation of the assembly 7 is the same as that hereinbefore described, the assembly 7 being connected by an air line 9 to the air supply for the braking cylinder and piston assembly of the gondola car 45. Although the assembly 7 has been shown in FIG. 4 as part of the bottom wall 46 of the car 45, it may, of course, be mounted on and form part of a side wall thereof instead of part of the bottom wall 46.

Since a railway car intended for the transport of particulate material normally is either empty or substantially full, it usually is necessary to include only one compensating reservoir assembly 7 on a car of this type. However, if the assembly 7 is intended for use on cars which may be used to transport different amounts, and hence, different weights, of particulate material, a plurality of assemblies 7 may be mounted on such cars. For example, a pair of similar assembles 7 each having a chamber 25 of one-half the volume required to reduce the air pressure in the brake cylinder and piston assembly 5 to said desired value for light loads may be mounted in side-by-side relation and may be set by means of different springs 38 to close the value 30 with different weights on the movable wall 14. Thus, when the car is empty, both of the valves 30 will be open, when the weight of the lading reaches a first predetermined value one of the valves 30 closes and when the weight of the lading reaches a higher predetermined value, the second valve 30 closes. In this way, three different levels of braking force will be obtained, a minimum braking force for an empty car, an intermediate braking force for a partly filled car and the maximum braking force for a full car.

Similarly, two similar assemblies 7 each with a chamber 25 of one-half the volume required to reduce the braking force to said desired value for light loads, and each having similar springs 38 so that each value 30 is closed by the same weight, may be mounted on different levels on the car. For example, one assembly 7 may be mounted on the bottom wall or floor and the other assembly 7 may be mounted on a side wall at a portion thereof intermediate the floor and the top of the car. In this way, three different braking force levels will be similarly obtained.

Also, it will be apparent to those skilled in the art that a pair of reservoir assemblies 7 with a common wear plate 23 and with the valves 30 thereof closing with a different weight may be employed to provide three different braking force levels.

Figure 5:
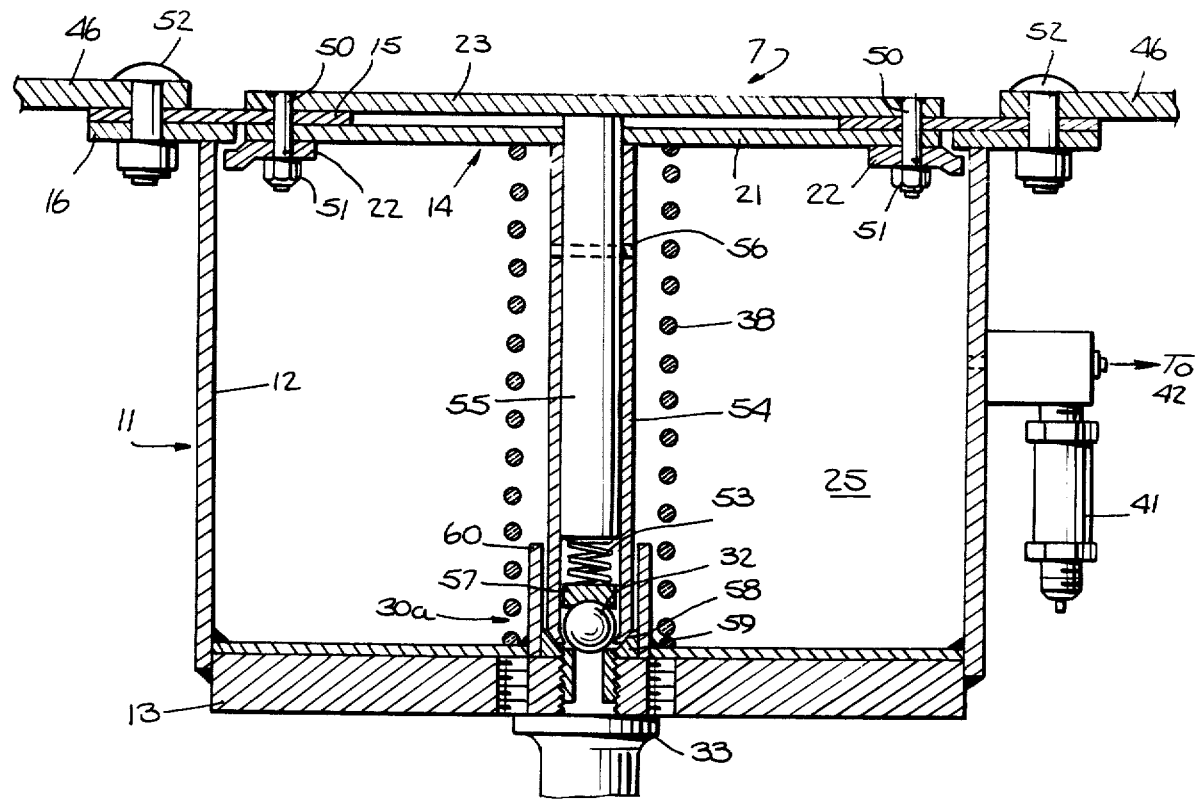
FIG. 5 is a side elevation view, partly in cross-section and similar to FIG. 3, of a modified form of the compensating reservoir assembly.

An embodiment of the invention which eliminates certain manufacturing, installation and other problems is illustrated in FIG. 5. In such embodiment, the wear plate 23 has a plurality of studs 50 secured thereto and extending therefrom, and the elastomeric disc or ring diaphragm 15 is clamped between the plate 21 and the plate 23 by means of nuts 51 on the studs 50. The studs 50 and the nuts 51 may also be used to assist in holding the tabs 22 on the plate 21.

In the embodiment shown in FIG. 5, the ring 19 shown in FIG. 3 and its accompanying installation may be eliminated by securing the flange 16 and the disc 15 to the wall 46 (or the slope sheet 4) by carriage bolts 52.

In addition, in the embodiment of FIG. 5 the ball 32 of the valve 30a is urged in the direction of the valve seat 59 by a separate, relatively stiff spring 53, and the shaft 35 of the embodiment in FIG. 3 is modified to receive such spring urged ball 32. Thus, in FIG. 5 the ball 32 is interconnected with the movable wall 14 by a tubular shaft 54 which receives a solid shaft 55 therein, the latter shaft 55 being prevented from moving axially of the tubular shaft 54 by a pin 56 extending therethrough.

The ball 32 is received in, and is free to move in, the lower end portion of the tubular shaft 54 and the ball 32 is urged downwardly, as viewed in FIG. 5, by a thrust plate or disc 57 against which the spring 53 bears, the opposite end of the spring 53 bearing against the shaft 55. The lower end 58 of the tubular shaft 54 is frusto-conical in shape and bears against a corresponding surface of the elastomeric seat 59 which is secured to the wall 13. The seat 59 and the lower portion of the tubular shaft 54 are surrounded by a tube 60 secured to the wall 13 and the spring 38 surrounds such tube 60 and performs the functions described hereinbefore.

In FIG. 5, the various parts are shown in the positions assumed thereby when the weight on the plate 23 is sufficient to close the valve 30a, and in this position the spring 53 applies sufficient force to the ball 32 to maintain it closed against the pressure of air which is supplied to the assembly 7 by the line 9. When the particulate matter is loaded into the car, the plate 23 will move downwardly, as viewed in FIG. 5, and the ball 32 will first engage the seat 59 thereby preventing air from entering into the chamber 25 when the brakes are applied. As the plate 23 further moves downwardly, the end portion 58 will engage the seat 59 providing double-sealing of the chamber 25 against the ingress of air from the line 9.

In certain railway car installations, it is necessary that the air pressure in the line 8, and hence, in the line 9, reach approximately 12 p.s.i. during the initial operation of the brake applying valve, the purpose of such air pressure being to provide certain operations not relevant to the invention. However, in such installations, it is necessary that the air not be admitted into the chamber 25 until the air pressure in the line 9 is at least 12 p.s.i. The embodiment in FIG. 6 illustrates a valve 30b which may be employed in the compensating reservoir assembly 7 employed in such railway car installations.

In the embodiment in FIG. 6, the valve 30b comprises a piston 61 having a central bore 62 and an air outlet 63. The piston 61 is received in the hollow, lower end of the tubular shaft 54a and may be maintained in air-tight relationship therewith by an O-ring 64. The piston 61 is retained within the lower end of the shaft 54a by a retaining ring 65.

The lower end of the piston 61 is maintained in air-tight relationship with the seat 66 by an O-ring 67 and a ball 68 is loosely received in the central bore 62. The ball 68 is retained in such bore 62 by a retaining ring 69, and the ball bears against the seat 70 when it is urged upwardly, as viewed in FIG. 6, by air in the line 9, thereby preventing the passage of air through the outlet passage 63.

When in the position shown in FIG. 6, the lower end of the tubular shaft 54a is maintained in air-tight relationship with the tube 60 by an O-ring 71 so that the passage of air from the line 9 into the chamber 25 is prevented by the O-ring 71. However, when the lower end of the shaft 54a is moved upwardly by reason of the spring 38 and the piston 61 has been moved upwardly by the air in the line 9, and hence, when there is no significant weight on the plate 23 and the pressure in the line 9 is at least 12 p.s.i., air from the line 9 is permitted to flow into the chamber 25 past the O-rings 67 and 71. Of course, it will be apparent that other known types of sealing means may be used in place of the O-rings 64, 67, 71.

Regardless of the position of the shaft 54a, the passage of air between the O-ring 67 and the seat 66 and into the chamber 25 will be prevented until the piston 61 has been raised by the air under pressure supplied by the line 9. Thus, the piston 61 is urged downwardly by the spring 53 and maintains the O-ring 67 in contact with the seat 66 until the air pressure in the line 9 is sufficient to raise the piston 61. The force applied to the piston 61 by the spring 53 may be selected to have the desired value, such as a force which will maintain the O-ring 67 against the seat 66 until the air pressure is 12 p.s.i. During the application of the brakes, and hence, the supply of air under pressure to the line 9, the ball 68 is moved upwardly against the seat 70 thereby closing the passage 63 and causing the piston 61 to effectively be a solid piston, the pressure of the air supplied by the line 9 to the bore 62 and applied to the lower end face of the piston 61 forcing the piston 61 upwardly when the air pressure exceeds a predetermined value, such as 12 p.s.i. However, when the brakes are released, the pressure of the air in the line 9 reduces substantially to zero, and the ball 68 moves away from the seat 70. If the car is empty, i.e., the shaft 54a is in its upper position, air will then flow outwardly from the chamber 25 through the passage 63 and the central bore 62 into the line 9.

Accordingly, in the embodiment illustrated in FIG. 6, the pressure of the air in the line 9 must equal at least 12 p.s.i. before any air will be admitted by the valve 30b into the chamber 25. If the wear plate 23, and hence, the shaft 54a, indicate that the car is empty, then after the pressure reaches 12 p.s.i. air will flow from the line 9 into the chamber 25 past the O-rings 67 and 71. On the other hand, if the wear plate 23 and the shaft 54a are in the positions thereof assumed when the car is loaded, and hence, the position of the shaft 54a shown in FIG. 6, passage of air from the line 9 into the chamber 25 will be prevented by the O-ring 71 even if the piston 61 moves upwardly sufficient to disengage the O-ring 67 from the seat 66.

FIG. 7 illustrates a further embodiment of a valve which may be employed in the compensating reservoir assembly 7 of the invention, and which may be employed in place of the valves 30 and 30a shown in FIGS. 3 and 5 when the assembly 7 is installed in systems where it is unnecessary to have an initial pressure rise in the braking air system as described hereinbefore. The valve 30c shown in FIG. 7 is mounted on the end wall 13 in a manner similar to the mounting of the valve 30a shown in FIG. 5, and comprises a seat 75 with a tubular end portion 76 which surrounds the lower end of the shaft 35a and engages the lower end of the spring 38. The valve 30c also comprises a ball 32 which, when the shaft 35a is in the position shown, indicating an empty car, is free floating. In other words, due to gravity the ball 32 normally will engage the seat 75 and prevent air from escaping through the passageway 77 from the chanber 25 into the line 9. However, when air is supplied to the passageway 77 by the line 9, the ball 32 will rise and permit air to pass therearound and through the space between the shaft 35a and the tubular end portion 76 into the chamber 25. When the brakes are released, the ball 32 will act as a check valve preventing air from flowing from the chamber 25 to the line 9, and, therefore, the seat 75 is provided with a check valve 78 which prevents the flow of air from the passageway 77 into the chamber 25 through the valve 78 but permits air to flow outwardly from the chamber 25 into the passageway 77 and thence into the line 9.

When the shaft 35a is moved downwardly by the weight of the lading on the movable wall 14, the end of the shaft 35a holds the ball 32 against the seat 75 thereby preventing air from passing from the line 9 into the chamber 25.

In the embodiment in FIG. 7, the limiting valve 41 is mounted on the end wall 13 rather than on the cylindrical wall 12, but, if desired, it may be mounted on the latter.

FIG. 8 illustrates a further embodiment of the valve which may be used in the compensating reservoir assembly 7 of the invention, and may be used in place of the valve 30b shown in FIG. 6 when it is desired to have an initial rise of pressure in the braking air system for the reasons described hereinbefore. The valve 30d shown in FIG. 8 comprises a seat 75 having a tubular end portion 76 which surrounds the lower end of the shaft 35b and engages the lower end of the spring 38. The shaft 35b is shown in the position assumed thereby when a car is empty, but in the construction shown in FIG. 8, the ball 32 is not free to float with respect to the seat 75. Instead, the ball 32 is held against the seat 75 by a plunger 80 engaging the ball 32 and urged downwardly by a spring 81 similar to the spring 53 shown in FIG. 6. The plunger 80 is received within the tubular end portion of the shaft 35b and is maintained in fluid-tight relationship therewith by an O-ring 82 or other sealing means. The plunger 80 is retained within the tubular end portion of the shaft 35b by a retaining ring 83.

Thus, when the car is empty, the ball 32 is maintained against the seat 75 by the plunger 80 and the spring 81 until the air pressure in the passageway 77, which connects to the line 9, exceeds the desired initial pressure value, e.g., 12 p.s.i. When the air pressure in the passageway 77 exceeds such desired initial pressure, the ball 32 separates from the seat 75 permitting air to enter the chamber 25 between the ball 32 and the seat 75 and between the lower end of the shaft 35b and the tubular end portion 76 of the seat 75.

It will be observed that the upper end 84 of the plunger 80 is slightly spaced from a projection 85 on the shaft 35b, so that when the shaft 35b is in its empty car position, the plunger 80 is permitted to move as described. However, when the car is loaded, the shaft 35b moves downwardly causing the projection 85 to engage the end 84 of the plunger 80 and thereby preventing movement of the ball 32 away from the seat 75.

The seat 75 is provided with a check valve 78 having the functions and purposes described in connection with FIG. 7, and the limiting valve 41 is mounted on the end wall 13. However, the limiting valve 41 may, if desired, be mounted on the cylindrical wall 12.

It will be observed that in the embodiments described hereinbefore, the movable wall comprises a flexible member 15 which is made of an elastomeric material, such as natural or synthetic rubber, etc., which may or may not be reinforced. Although only a small portion of such member 15 is usually exposed to the lading in the car, nevertheless, it can be punctured accidentally or can crack in extended use. Since the member 15 forms part of a sealing wall of the reservoir, such a puncture or crack can permit air to escape from the reservoir and thereby cause a loss of car braking.

In the modified embodiment of the invention illustrated in FIG. 9, the advantages of the invention can be obtained without the danger of possible loss of car braking due to puncturing of the flexible member 15. The compensating reservoir assembly 90 illustrated in FIG. 9 comprises a cylinder 91 having a cylindrical wall 92, a fixed end wall 93 at one end of the cylindrical wall 92, and a fixed end wall 94 at the opposite end of the cylindrical wall 92. The end walls 93 and 94 are in fluid-tight relationship with the cylindrical wall 92 and together the walls 92–94 form a chamber 95 for receiving part of the air employed to actuate the car brakes as described hereinbefore.

The compensating reservoir assembly 90 also comprises a movable end wall 96 which comprises a pair of circular end metal discs 97 and 98 on the opposite sides of a flexible member 99 which corresponds to the flexible member 15 described hereinbefore. The discs 97 and 98 are secured to the flexible member 99 by rivets 100, the lower ends 101 of which are engageable with the end wall 94 when the movable wall 96 moves inwardly, and thereby limit the inward movement of the movable wall 96. Such movement may be limited to the order of three-eighths of an inch. Of course, the discs 97 and 98 may be secured to the flexible member 99 in other ways, such as by vulcanizing or with the use of adhesives. Also, if the member 99 has sufficient abrasion resistance the disc 97 may be omitted.

The flexible member 99 is secured between the flange 102, which is secured to the cylindrical wall 92, such as by welding, and the slope sheet 4 by means of bolts (not shown) which pass through the holes 103. The end wall 94 is spaced inwardly from the movable wall 96 so as to provide a space 104 therebetween, the space 104 being vented to the atmosphere through a plurality of small holes 105 in the cylindrical wall 92.

Figure 2:
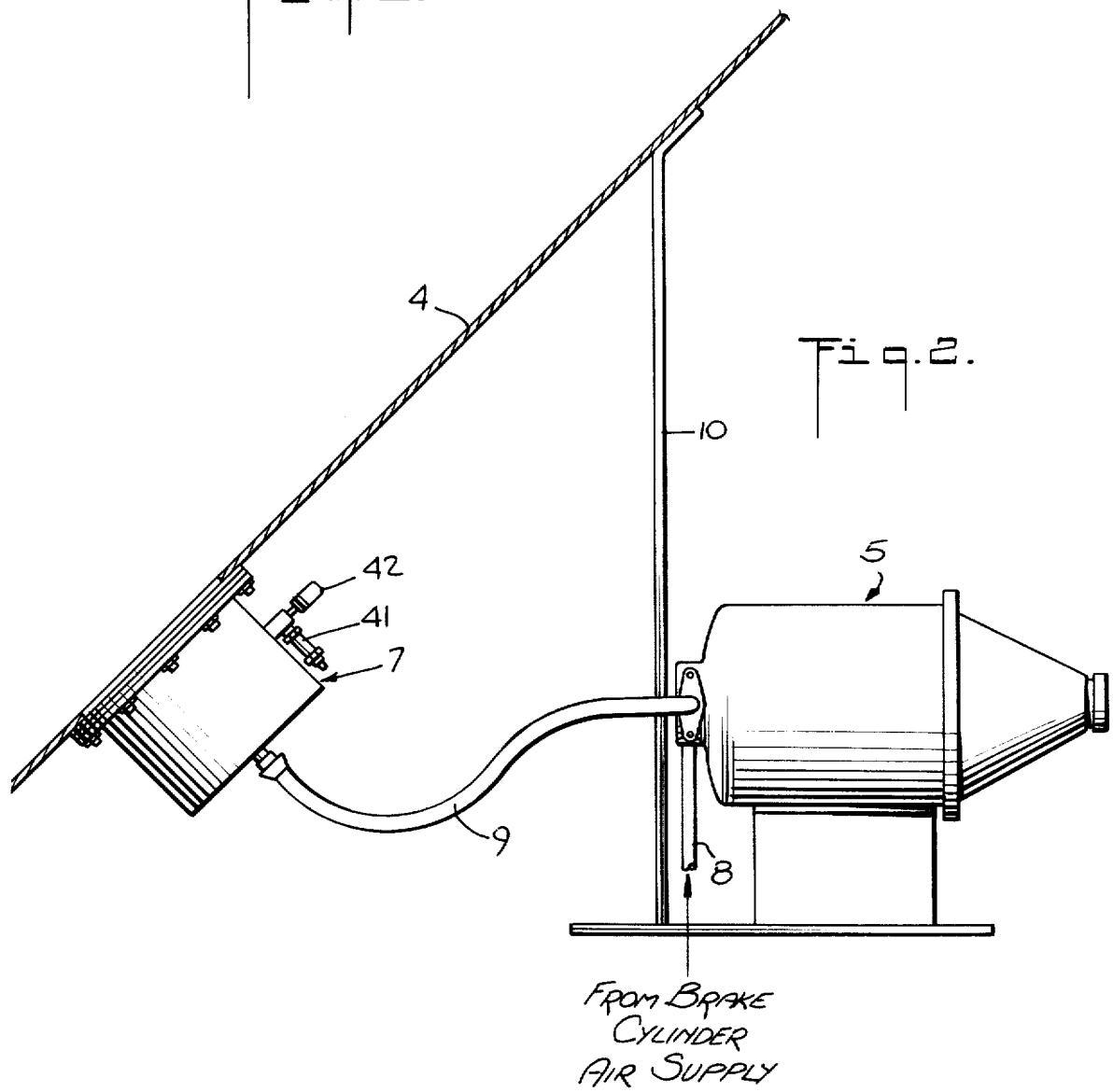
FIG. 2 is an enlarged, fragmentary, side elevation view showing a portion of the apparatus in FIG. 1.

As in the embodiments described hereinbefore, the compensating reservoir assembly 90 is connected to the air line which supplies air to the cylinder and piston assembly 5 (FIG. 2), or the input of the cylinder and piston assembly 5, through an air line such as the air line 9 (FIGS. 1–3) connected to the fitting 106 secured to the flange fitting 107 which, in turn, is secured to the end wall 93 by means of bolts or screws 108. A resilient gasket 109 is interposed between the fitting and the end wall 93, and the ends of the bolts 108 may be covered by caps 108a in fluid-tight relationship with the end wall 93, e.g., by welding the caps 108a to the wall 93.

A cylindrical tube 110 extends between the end walls 93 and 94 and is secured in air-tight relation to such end walls 93 and 94, such as by welding. The lower portion 111 of the interior of the wall of the tube 110 is given a smooth finish such as by machining and honing, and a piston 112 is received within the lower portion 111 of the tube 110. The piston 112 has an extension 113 which extends to and engages the disc 98 and which has a shoulder 114 engageable with the end wall 94 to limit outward movement of the piston 112. The piston 112 is urged toward the movable wall 96 by a spring 115 received within the hollow portion 116 of the piston 112, the spring 115 bearing at one end against a seat 117 in the form of a washer and retained within the tube 110 by a retaining ring 118.

The piston 112 has a pair of peripheral grooves 119 and 120 which receive resilient O-rings 121 and 122. FIG. 9 illustrates the relative positions of the parts when there is no lading on the movable wall 96, and in such positions of the parts, the piston 112 permits air supplied to the assembly 90 through the fitting 106, to pass through openings 123 in the wall of the tube 110 into the chamber 95. However, when the movable wall 96 is moved downwardly, as viewed in FIG. 9, the extension 113 in engagement therewith moves the piston 112 downwardly against the force of the spring 115 causing the O-ring 122 to engage the portion of the wall of the tube 110 below the openings 123 thereby preventing air from passing from the fitting 106 through the openings 123 and into the chamber 95. The O-ring 121 is provided so as to prevent air which may leak past the O-ring 122 at intermediate positions of the piston 112 from passing into the space 104 by way of the clearance between the extension 113 and the interior of the wall of the tube 110.

As in the embodiments described hereinbefore, when the lading on the movable wall 96 is insufficient to overcome the force of the spring 115, and hence, when the car is lightly loaded, air is permitted to enter the chamber 95 thereby reducing the car braking force. However, when the car is more heavily loaded, e.g., when the lading exerts a force of approximately 75 lbs. on the wall 96, the wall 96 moves to a position such that air is prevented by the piston 112 from passing into the chamber 95 through the holes 123, and full braking force will be applied to the car brakes.

The cylinder 91 may be provided with an adjustable pressure limiting valve 41 for the purpose described hereinbefore. In addition, the cylinder 91 may be provided with a pressure indicator 124 with a plunger 125 which extends when there is air under pressure in the chamber 95. When there is no air under pressure in the chamber 95, the plunger 125 retracts. Accordingly, by observation of the plunger 125 it can be determined whether or not the compensating assembly is operating properly, i.e., if the car is empty and the brakes are applied the plunger 125 should be extended, whereas if the car is loaded and the brakes are applied, the plunger 125 should be retracted.

Although preferred embodiments of the present invention have been illustrated and described, it will be apparent to those skilled in the art that various modifications may be made without departing from the principles of the invention.

What is claimed is:

1. A load compensating reservoir assembly for controlling the fluid pressure in a car brake cylinder and piston assembly operable by said fluid, said compensating reservoir assembly comprising a multi-walled reservoir, one of said walls being movable and in fluid-tight relationship with said reservoir and being adapted to form part of a wall of said car, a fluid valve on a wall of said reservoir, said valve having an inlet for receiving said fluid from externally of said reservoir, having an outlet opening into said reservoir and having control means for alternately opening and closing said valve and thereby permitting and preventing passage of fluid therethrough, and means internally of said reservoir interconnecting said movable wall and said control means for opening and closing said valve dependent upon the position of said movable wall.

2. An assembly as set forth in claim 1, wherein said interconnecting means closes said valve when said movable wall moves inwardly of said reservoir and opens said valve when said movable wall moves in the opposite direction.

3. An assembly as set forth in claim 2, wherein one of said walls of said reservoir is tubular, said movable wall comprises a disc-shaped wear plate at one end of said tubular wall and a flexible member interconnecting said plate and said tubular wall and another of said walls is an end wall in fluid-tight relation with said tubular wall at the other end thereof, wherein said valve is on said end wall and said interconnecting means comprises a shaft connected to said movable wall at one end and to said control means at its opposite end and further comprising spring means acting between said movable wall and said end wall and urging said movable wall away from said end wall.

4. An assembly as set forth in claim 3, further comprising a pressure limiting valve mounted on a wall of said reservoir other than said movable wall and communicating with the interior of said reservoir for limiting the fluid pressure therein to a predetermined value.

5. An assembly as set forth in claim 3, wherein said shaft has a hollow portion at said opposite end thereof and said control means is a flow control element within said hollow portion and movable therein and wherein said valve comprises a seat mounted on said end wall and having an opening therein which communicates with the exterior of said end wall, said flow control element being engageable with said seat to close said opening.

6. An assembly as set forth in claim 5, further comprising a check valve interconnecting the interior of said reservoir and said inlet, said check valve preventing the flow of said fluid from said inlet to said interior of said chamber and permitting the flow of fluid in the opposite direction.

7. An assembly as set forth in claim 5, further comprising spring means between said flow control element and said shaft and urging said element toward said seat.

8. An assembly as set forth in claim 7, wherein said opposite end of said shaft is also engageable with said seat.

9. An assembly as set forth in claim 7, wherein said spring means comprises a plunger engaging said flow control element and a spring acting between said plunger and said shaft and urging said plunger toward said seat, said plunger being movable with respect to said shaft from a first position in which it engages said shaft and is prevented from moving away from said seat to a second position in which it is spaced from said shaft and is permitted to move away from said seat.

10. An assembly as set forth in claim 9, further comprising a check valve interconnecting the interior of said reservoir and said inlet, said check valve preventing the flow of said fluid from said inlet to said interior of said chamber and permitting the flow of fluid in the opposite direction.

11. An assembly as set forth in claim 3, further comprising a tube mounted on said end wall and slidably receiving a portion of said opposite end of said shaft and wherein said shaft has a hollow portion at said opposite end thereof and said valve comprises means on one of said shaft and said tube for providing a fluid-tight seal therebetween when said movable wall moves inwardly and for permitting the passage of fluid therebetween when said movable wall moves outwardly, a seat on said end wall in fluid-tight relation with the end of said tube at said end wall and having a central opening communicating with the exterior of said end wall, a piston slidably mounted in said hollow portion of said shaft and having one end adjacent said seat and its opposite end within said hollow portion, spring means within said hollow portion and acting between said shaft and said opposite end of said piston to urge the latter toward said seat, means on one of said seat and said piston for providing a fluid-tight seal between said one end of said piston and said seat when said piston is in a first position nearer said seat and permitting the passage of fluid between said one end of said piston and said seat when said piston is in a second position farther from said seat, said piston having a hollow passageway therein extending from said one end thereof to a portion of the exterior thereof spaced from said seat and within said tube and having a check valve in said passageway which is operable by said fluid to its closed position in which the flow of fluid from said one end of said piston to said portion thereof is prevented, said piston being movable by said fluid from said first position to said second position when said check valve is closed and when the pressure of said fluid exceeds a predetermined value.

12. An assembly as set forth in claim 11, wherein said check valve comprises a ball within said passageway and movable therein into engagement with a portion of the wall of said passageway for closing the latter.

13. In braking apparatus for a car comprising a fluid-operable brake cylinder and piston assembly, brakes connected to and operable by said cylinder and piston assembly, a fluid supply of a predetermined volume connectible to said brake cylinder and piston assembly for supplying fluid under pressure to the latter, and a wall having a portion thereof movable by the weight of the lading in the car, the combination therewith of a compensating reservoir assembly mounted on said wall of said car, said assembly comprising a multi-walled reservoir, a fluid valve on a wall of said reservoir, said valve having an inlet, an outlet opening into said reservoir and control means for alternately opening and closing said valve with respect to the passage of fluid therethrough, means connecting said valve inlet to said fluid supply, and means extending within said reservoir and interconnecting said movable wall portion and said control means for opening and closing said valve dependent upon the position of said movable wall portion.

14. An assembly as set forth in claim 13, wherein said movable wall portion is in fluid-tight relation with and forms one wall of said reservoir and wherein said movable wall portion is movable inwardly of said reservoir by material within said car and said interconnecting means closes said valve when said movable wall portion moves inwardly of said reservoir and opens said valve when said movable wall portion moves in the opposite direction.

15. An assembly as set forth in claim 14, wherein one of said walls of said reservoir is tubular, said movable wall portion comprises a disc-shaped wear plate at one end of said tubular wall and a flexible member interconnecting said plate and said tubular wall and another of said walls is an end wall in fluid-tight relation with said tubular wall at the other end thereof, wherein said valve is on said end wall and said interconnecting means comprises a shaft connected to said movable wall portion at one end and to said control means at its opposite end and further comprising spring means acting between said movable wall portion and said end wall and urging said movable wall portion away from said end wall.

16. An assembly as set forth in claim 15, further comprising a pressure limiting valve mounted on a wall of said reservoir other than said movable wall portion and communicating with the interior of said reservoir for limiting the fluid pressure therein to a predetermined value.

17. An assembly as set forth in claim 15, wherein said shaft has a hollow portion at said opposite end thereof and said control means is a flow control element within said hollow portion and movable therein and wherein said valve comprises a seat mounted on said end wall and having an opening therein which communicates with the exterior of said end wall, said flow control element being engageable with said seat to close said opening.

18. An assembly as set forth in claim 17, further comprising a check valve interconnecting the interior of said reservoir and said inlet, said check valve preventing the flow of said fluid from said inlet to said interior of said chamber and permitting the flow of fluid in the opposite direction.

19. An assembly as set forth in claim 17, further comprising spring means between said flow control element and said shaft and urging said element toward said seat.

20. An assembly as set forth in claim 19, wherein said opposite end of said shaft is also engageable with said seat.

21. An assembly as set forth in claim 19, wherein said spring means comprises a plunger engaging said flow control element and a spring acting beteeen said plunger and said shaft and urging said plunger toward said seat, said plunger being movable with respect to said shaft from a first position in which it engages said shaft and is prevented from moving away from said seat to a second position in which it is spaced from said shaft and is permitted to move away from said seat.

22. An assembly as set forth in claim 21, further comprising a check valve interconnecting the interior of said reservoir and said inlet, said check valve preventing the flow of said fluid from said inlet to said interior of said chamber and permitting the flow of fluid in the opposite direction.

23. An assembly as set forth in claim 15, further comprising a tube mounted on said end wall and slidably receiving a portion of said opposite end of said shaft and wherein said shaft has a hollow portion at said opposite end thereof and said valve comprises means on one of said shaft and said tube for providing a fluid-tight seal therebetween when said movable wall moves inwardly and for permitting the passage of fluid therebetween when said movable wall moves outwardly, a seat on said end wall in fluid-tight relation with the end of said tube at said end wall and having a central opening communicating with the exterior of said end wal , a piston slidably mounted in said hollow portion of said shaft and having one end adjacent said seat and its opposite end within said hollow portion, spring means within said hollow portion and acting between said shaft and said opposite end of said piston to urge the latter toward said seat, means on one of said seat and said piston for providing a fluid-tight seal between said one end of said piston and said seat when said piston is in a first position nearer said seat and permitting the passage of fluid between said one end of said piston and said seat when said piston is in a second position farther from said seat, said piston having a hollow passageway therein extending from said one end thereof to a portion of the exterior thereof spaced from said seat and within said tube and having a check valve in said passageway which is operable by said fluid to its closed position in which the flow of fluid from said one end of said piston to said portion thereof is prevented, said piston being movable by said fluid from said first position to said second position when said check valve is closed and when the pressure of said fluid exceeds a predetermined value.

24. An assembly as set forth in claim 23, wherein said check valve comprises a ball within said passageway and movable therein into engagement with a portion of the wall of said passageway for closing the latter.

25. A load compensating reservoir assembly for controlling the fluid pressure in a car brake cylinder and piston assembly operable by said fluid, said compensating reservoir assembly comprising a reservoir having a plurality of walls, one of said walls being a movable external wall at one end of said reservoir and being adapted to form part of a wall of said car, and a plurality of said walls being in fluid-tight relationship to form a chamber for receiving said fluid, a fluid valve on a wall of said reservoir, said valve having an inlet for receiving said fluid from externally of said reservoir, having an outlet opening into said chamber and having control means for alternately opening and closing said valve and thereby permitting and preventing passage of fluid therethrough, and means internally of said reservoir interconnecting said movable wall and said control means for opening and closing said valve dependent upon the position of said movable wall.

26. An assembly as set forth in claim 25, wherein one of said plurality of walls forming said chamber is at said one end of said reservoir and is spaced from said movable wall in a direction inwardly of said reservoir to provide a spaced between said last-mentioned one wall and said movable wall.

27. An assembly as set forth in claim 26, wherein said reservoir has an opening in a wall thereof which extends from said space to the atmosphere externally of said reservoir.

28. An assembly as set forth in claim 25, wherein a second one of said plurality of walls forming said chamber is a tubular wall, said first-mentioned one of said plurality of walls forming said chamber is in fluid-tight relationship with said tubular wall at one end thereof and a third one of said plurality of walls forming said chamber is in fluid-tight relationship with said tubular wall at the opposite end thereof, and wherein said valve comprises a cylinder secured to said third one of said plurality of walls and said control means comprises a piston slidably mounted in said cylinder, said cylinder having said inlet at one end thereof and said outlet in the wall thereof and said piston being movable from a first position in which it covers said outlet to a second position in which it uncovers said outlet.

29. An assembly as set forth in claim 28, wherein said movable wall comprises a flexible member covering said one end of said tubular wall.

* * * * *

UNITED STATES PATENT OFFICE
CERTIFICATE OF CORRECTION

PATENT NO. : 3,960,411
DATED : June 1, 1976
INVENTOR(S) : Robert G. Beacon

It is certified that error appears in the above-identified patent and that said Letters Patent are hereby corrected as shown below:

| | | |
|---|---|---|
| Col. 1, line 60 | "advantageous" should read --disadvantageous-- |
| Col. 2, line 21 | "assmebly" should read --assembly-- |
| Col. 3, line 67 | "seal" should read --seat-- |
| Col. 4, line 51 | "valve" should read --value-- |
| Col. 6, line 21 | "assembles" should read --assemblies-- |
| line 26 | "value" should read --valve-- |
| line 40 | "value" should read --valve-- |
| Col. 8, line 7 | insert --and-- between "67, 71" |

Signed and Sealed this

Thirty-first Day of August 1976

[SEAL]

Attest:

RUTH C. MASON
*Attesting Officer*

C. MARSHALL DANN
*Commissioner of Patents and Trademarks*